Figure 1:
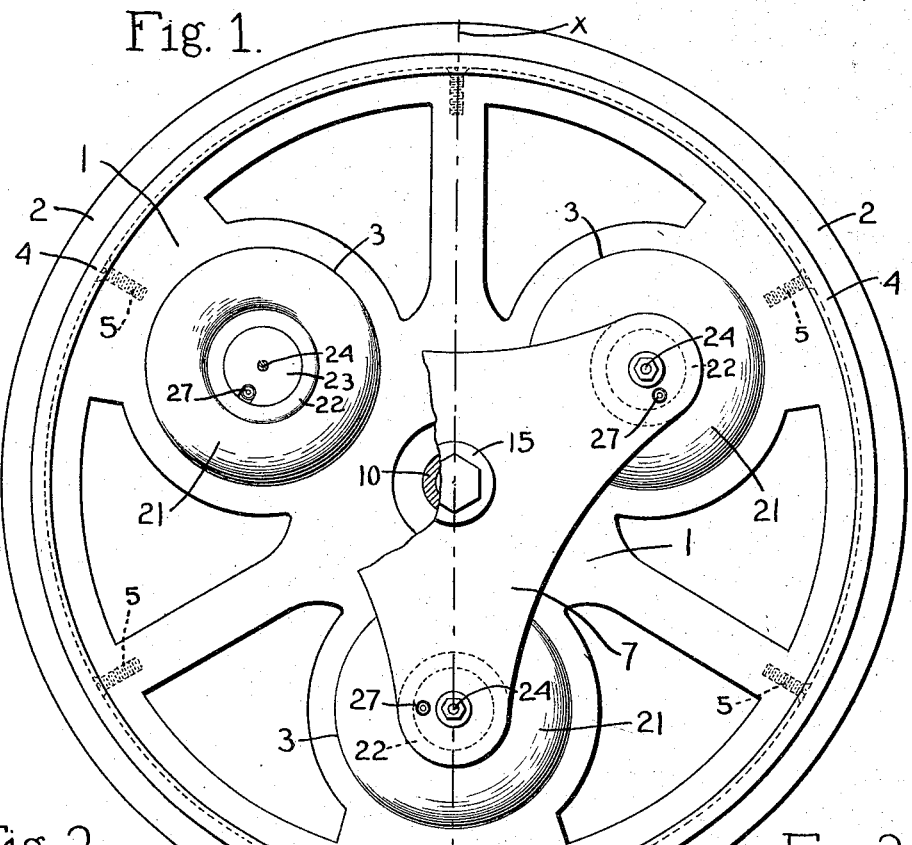

J. O. RAYMOND.
PNEUMATIC WHEEL.
APPLICATION FILED JAN. 16, 1915.

1,166,854.

Patented Jan. 4, 1916.

Witnesses.
J. Morrill Fuller
William C. Gagen

Inventor
Joseph O. Raymond
by Heard Smith & Tennant
Att'ys

UNITED STATES PATENT OFFICE.

JOSEPH O. RAYMOND, OF CONCORD, NEW HAMPSHIRE.

PNEUMATIC WHEEL.

1,166,854.  Specification of Letters Patent.  Patented Jan. 4, 1916.

Application filed January 16, 1915. Serial No. 2,747.

*To all whom it may concern:*

Be it known that I, JOSEPH O. RAYMOND, a citizen of the United States, residing at Concord, county of Merrimack, State of New Hampshire, have invented an Improvement in Pneumatic Wheels, of which the following description, in connection with the accompanying drawing, is a specification, like characters on the drawing representing like parts.

This invention relates to pneumatic wheels of that type which include a plurality of pneumatic chambers interposed between the hub portion and the body portion of the wheel, and the object of the invention is to provide a wheel of this nature having the novel features which will be more fully hereinafter described and then pointed out in the appended claim.

Figure 2:
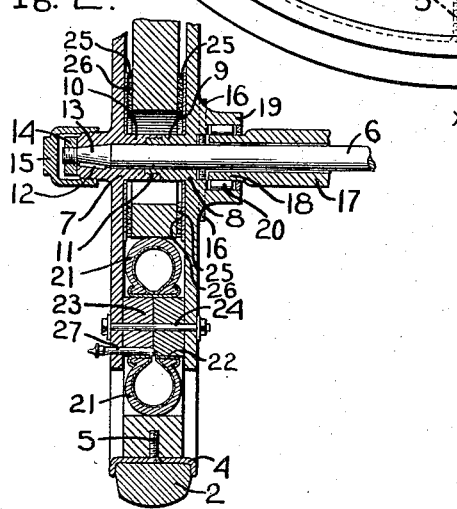
Figure 3:
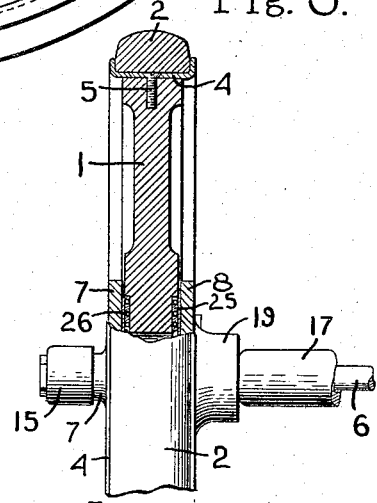

Referring to the drawings wherein I have illustrated a selected embodiment of my invention, Figure 1 is a side view of a wheel made in accordance with my invention with a portion broken out; Fig. 2 is a section through the lower portion of the wheel on the line $x$—$x$, Fig. 1; Fig. 3 is a section through the upper portion of the wheel on the line $x$—$x$, Fig. 1.

The wheel herein shown is of that type of pneumatic wheel which comprises a body portion having a plurality of pockets, a hub portion secured to an axle and pneumatic members occupying the pockets of the body portion and connected to the hub portion.

The object of the present invention is to provide a wheel of this type with a novel form of hub and novel way of securing it to the axle, and also with a novel bearing for the wheel, and otherwise to improve the wheel, all as will be hereinafter described.

The body portion of the wheel is shown at 1, and it is formed with an exterior tread surface which may be in the form of a solid tire member 2, and is also provided with a plurality of pockets 3 in which the pneumatic members are received. This body portion may be made in any suitable way, but will preferably be cast from some suitable metal. The tire portion 2 is shown as being received in a rim member 4 which encircles the wheel body 1 and is secured thereto by suitable screws 5. The pockets 3 are circular in shape and extend from one side to the other of the wheel body. The hub portion of the wheel is secured to the axle 6 and it comprises two side members 7 and 8 that overlie the sides of the body portion 1. The side member 8 is provided with a central portion 9 that fits the axle 6 and is screw-threaded to the central portion 10 of the side member 7, as shown at 11. Both the side members 7 and 8 are rigidly secured to the axle 6, the side member 7 being keyed thereto, as shown at 12, the axle being tapered at this point, as at 13, and the member 7 having a corresponding taper. The axle has screw-threaded to its end a nut 14 which holds the side member 7 in position, and this nut 14 is inclosed in a cap nut 15 which is screw-threaded to the member 7. The side member 8 is rigidly secured to the axle by means of a plurality of set screws 16, although any other way of accomplishing this might be adopted. The axle 6 is inclosed in a casing or housing 17, such as is commonly employed for inclosing the rear axle of an automobile.

In my invention the wheel finds its bearing on the housing 17, and for this purpose the end 18 of the housing is formed to present a track for an anti-friction bearing, and the side member 8 is provided with the laterally-extending flange 19 which encircles the end of the housing and which incloses an anti-friction bearing 20 preferably in the form of a roller bearing, the rollers of the bearing resting on the track formed at the end 18 of the housing. This anti-friction bearing 20 constitutes the sole bearing of the wheel on the housing.

The side plates 7 and 8 have secured thereto annular pneumatic members 21 which are received in the pockets 3, these pneumatic members being in the form of pneumatic tubes constructed somewhat similar to the ordinary pneumatic tire. Each of the annular pneumatic chambers 21 is mounted on a circular holder 22 which in turn encircles a block or filling piece 23 that is secured to the two side plates 7 and 8 by means of a bolt 24. The blocks 23 will preferably be made in two parts, although this is not essential. The blocks 23, each with an annular pneumatic chamber 21 mounted thereon, are received in the pockets 3, the pockets being circular in shape to fit the shape of the air chambers 21. These air chambers provide a resilient connection between the hub and give the desired resiliency to the wheel. Although the wheel is rigidly secured to the driving axle 6, it will be noted that it has bearing on the housing 17 and that a single bearing is all that is required. This simplifies the construction and reduces the parts that are subjected to wear.

During the operation of the wheel there will, of course, be a slight relative movement between the hub portion and the body portion of the wheel. In order to freely permit this movement so that the full effect of the pneumatic chambers may be received, I propose to introduce an anti-friction bearing 25 between each side plate and the central portion of the wheel body. These anti-friction bearings are in the form of circular plates carrying balls 26 which engage the side plates and the side faces of the wheel body, respectively. Each of the pneumatic chambers 21 is shown as being provided with a valve stem 27 which leads out through the side of the block 23 and by means of which the chamber can be inflated in a manner similar to that in which pneumatic tires are inflated.

I claim:

In a wheel, the combination with an axle, of a wheel comprising a body portion and a hub portion, said hub portion presenting two connected side members between which the body portion is received, means for rigidly securing each of said side members to the axle, means connecting the body portion and hub portion, a housing inclosing the axle, a bearing flange integral with and extending laterally from one of the side members and encircling one end of the housing, and an anti-friction bearing between said flange and housing end.

In testimony whereof, I have signed my name to this specification, in the presence of two subscribing witnesses.

JOSEPH O. RAYMOND.

Witnesses:
BENJAMIN W. COUCH,
PEARL F. HALLORAN.

Copies of this patent may be obtained for five cents each, by addressing the "Commissioner of Patents, Washington, D. C."